United States Patent
Zhuo et al.

(10) Patent No.: US 11,030,528 B1
(45) Date of Patent: Jun. 8, 2021

(54) CONVOLUTIONAL NEURAL NETWORK PRUNING METHOD BASED ON FEATURE MAP SPARSIFICATION

(71) Applicant: ZHEJIANG UNIVERSITY, Zhejiang (CN)

(72) Inventors: Cheng Zhuo, Zhejiang (CN); Xingang Yan, Zhejiang (CN)

(73) Assignee: ZHEJIANG UNIVERSITY, Zhejiang (CN)

( * ) Notice: Subject to any disclaimer, the term of this patent is extended or adjusted under 35 U.S.C. 154(b) by 0 days.

(21) Appl. No.: 17/117,130

(22) Filed: Dec. 10, 2020

(30) Foreign Application Priority Data

Jan. 20, 2020 (CN) .......................... 202010066747.2

(51) Int. Cl.
*G06N 3/08* (2006.01)
*G06N 3/04* (2006.01)
*G06K 9/62* (2006.01)

(52) U.S. Cl.
CPC .......... *G06N 3/082* (2013.01); *G06K 9/6249* (2013.01); *G06K 9/6256* (2013.01); *G06K 9/6262* (2013.01); *G06K 9/6268* (2013.01); *G06N 3/04* (2013.01)

(58) Field of Classification Search
CPC combination set(s) only.
See application file for complete search history.

(56) References Cited

U.S. PATENT DOCUMENTS

| 2018/0114114 A1* | 4/2018 | Molchanov ............ G06N 3/082 |
| 2019/0200535 A1* | 7/2019 | Regan .................... G06N 3/08 |
| 2020/0097818 A1* | 3/2020 | Li .......................... G06N 3/0481 |

FOREIGN PATENT DOCUMENTS

| CN | 108985444 | * | 12/2018 | ............... G06N 3/04 |
| CN | 110222821 | * | 9/2019 | ............... G06N 3/04 |
| CN | 111062472 | * | 4/2020 | ............... G06N 3/04 |

(Continued)

OTHER PUBLICATIONS

Max Jaderberg et al., "Speeding up Convolutional Neural Networks with Low Rank Expansions," Computer Vision and Pattern Recognition (cs.CV), arXiv:1405.3866v1, May 15, 2014, pp. 1-13.

(Continued)

*Primary Examiner* — Zhiyu Lu
(74) *Attorney, Agent, or Firm* — JCIP Global Inc.

(57) ABSTRACT

A convolutional neural network pruning method based on feature map sparsification, which relates to how to compress the convolutional neural network to reduce the number of parameters and amount of computation so as to facilitate actual deployment, is provided. In the training process, by adding regularization to the feature map L1 or L2 after the activation layer in the loss function, the corresponding feature map channels have different sparsity. Under a certain pruned ratio, the convolution kernels corresponding to the channels are pruned according to the sparsity of the feature map channels. After fine-tune pruning, the network obtains new accuracy, and the pruned ratio is adjusted according to the change of accuracy before and after pruning. After multiple iterations, the near-optimal pruned ratio is found, and pruning is realized to the maximum extent under the condition that the accuracy does not decrease.

5 Claims, 2 Drawing Sheets

(56) References Cited

FOREIGN PATENT DOCUMENTS

| CN | 111144551 | * | 5/2020 | ............... | G06N 3/04 |
| CN | 111723915 | * | 9/2020 | ............... | G06N 3/04 |

OTHER PUBLICATIONS

Suyog Gupta et al., "Deep Learning with Limited Numerical Precision," Machine Learning (cs.LG), arXiv:1502.02551v1, Feb. 9, 2015, pp. 1-11.

Sergey Zagoruyko et al., "Paying More Attention to Attention: Improving the Performance of Convolutional Neural Networks via Attention Transfer," Computer Vision and Pattern Recognition (cs.CV), arXiv:1612.03928v3, Feb. 12, 2017, pp. 1-13.

* cited by examiner

CONVOLUTIONAL NEURAL NETWORK PRUNING METHOD BASED ON FEATURE MAP SPARSIFICATION

CROSS-REFERENCE TO RELATED APPLICATION

This application claims the priority benefit of China application serial no. 202010066747.2, filed on Jan. 20, 2020. The entirety of the above-mentioned patent application is hereby incorporated by reference herein and made a part of this specification.

BACKGROUND

Technical Field

The invention relates to a convolutional neural network compression technology in the field of deep learning, in particular to a convolutional neural network pruning method based on feature map sparsification.

Description of Related Art

Convolutional neural network is a common deep learning network architecture, which performs well in image classification, target detection, image style transfer and many other issues. At the same time, the operation mode of convolutional neural network is still a black box, and there is no solid theoretical basis on how to set the number of layers and the number of channels of each layer for specific problems. The artificially set number of layers and number of channels of each layer will cause redundancy of network parameters most of the time, making the amount of computation of convolutional neural network be large and occupy too much memory, which is not conducive to the application of the network. Therefore, it is necessary to compress the model of convolutional neural network.

To solve the model compression problem of convolutional neural networks, predecessors put forward low-rank expansion, quantization, knowledge distillation, pruning and other methods.

In non-patent reference 1 (Jaderberg M, et. al. "Speeding up convolutional neural networks with low rank expansions." Proc. arxiv, 2014), the method of low-rank expansion is used to split the convolution operation of convolution layers, achieving 4.5 times acceleration effect, but causing the accuracy to decrease by 1%.

In non-patent reference 2 (Gupta S, et. al. "Deep learning with limited numerical precision." Proc. International Conference on Machine Learning, 2015), a 16-bit fixed-point number is used to train convolutional neural networks, and the accuracy on MNIST datasets does not decrease, but the test results on larger datasets are not given in the paper.

In non-patent reference 3 (Zagoruyko S, et. al. "Paying more attention to attention: improving the performance of convolutional neural networks via attention transfer." Proc. arxiv, 2016), by means of feature learning, a small convolutional neural network learns the features of a large neural network, and then achieves the purpose of compressing the model. However, what number of layers and what number of channels in each layer are suitable for a small convolutional neural network is still an unsolved problem.

In order to speed up the computation of convolutional neural network and reduce the requirement of hardware equipment for network computation, a structured pruning method is designed from the perspective of sparsification of convolutional neural network feature maps.

SUMMARY

Aiming at the deficiencies of the prior art, the invention provides a convolution neural network pruning method based on feature map sparsification.

Common convolutional neural networks, such as VGG and ResNet, are composed of convolution layer, batch normalization layer and nonlinear activation layer. Each group of convolution layer, batch normalization layer and nonlinear activation layer is taken as feature extraction unit of the convolution neural network, and these feature extraction units are arranged in sequence according to the depth direction of the convolution neural network. Output feature maps of one set of feature extraction units are used as input feature maps of the next set of feature extraction units.

The technical scheme adopted in the present invention for solving the technical issue is provide as below: a convolution neural network pruning method based on feature map sparsification, the method comprising the following steps:

1) Performing sparsification training on feature maps in the convolutional neural network;

In the training process, adding a sparsification item of the feature map to a loss function of the convolutional neural network, the sparsification item of the feature map is as follows:

$$loss_f = \lambda \times \sum_{l=1}^{l=L} \sum_{c=1}^{c=C_l} \left( \frac{1}{H_{l,c} W_{l,c}} \sum_{i=1}^{i=H_{l,c}} \sum_{j=1}^{j=W_{l,c}} g(m_{i,j}) \right)$$

wherein, $\lambda$ is a sparsification factor controlling the proportional relationship between the loss resulted from the convolution neural network prediction and the sparsification item loss, l is the activation layer index, L is the number of the activation layer, c is the channel index of the feature map after the lth activation layer, $C_l$ is the channel number of the feature map after the lth activation layer, $H_{l,c}$ and $W_{l,c}$ are the height and width of the cth channel after the lth activation layer, respectively, and $m_{i,j}$ is No. (i,j) numerical value of corresponding feature map; and g( ) is L1, L2 regularization or other regular items;

L1 regularization formula is:

$$g(m_{i,j}) = \|m_{i,j}\|_1$$

L2 regularization formula is:

$$g(m_{i,j}) = \|m_{i,j}\|_2$$

Calculating a mean value of the feature map channel by traversing the entire training data set using the mean value as a sparsity of the feature map, the sparsity being different due to different input samples, at the same time, saving the sparsity of the feature map, adding a feature map channel selection layer, and after training the convolutional neural network and making it convergent, saving the highest accuracy of the verification set and the corresponding network weight.

2) Network pruning.

2.1) Setting an initial pruned ratio, and setting an upper limit of the pruned ratio as 1 and a lower limit of the pruned ratio as 0.

2.2) Taking a weight of the network with the highest accuracy of the verification set as the weight of the convolutional neural network, and pruning according to the following rules:

Sorting the sparsity of each channel of the feature map from small to large, i.e. the $\text{sort}_{min \to max}\{\text{feature map sparsity}\}$, and then setting a value of non-learnable parameter mask of the channel selection layer corresponding to the first n channels as 0 and a value of non-learnable parameter mask of the channel selection layers corresponding to the remaining channels as 1 according to the pruned ratio for the sparsity of the feature map of each channel.

Retraining the pruned network until convergence of the network and obtaining the highest accuracy of the pruned verification set.

2.3) Comparing the highest accuracy of verification sets before and after pruning, if the highest accuracy of verification set after pruning is greater than or equal to the highest accuracy of verification set before pruning, taking the current pruned ratio as a new lower limit of the pruned ratio, and increasing the pruned ratio; otherwise, taking the current pruned ratio as a new upper limit of the pruned ratio, and reducing the pruned ratio, repeating steps 2.2) and 2.3) until the difference between the upper and lower limits of the pruned ratio is less than a certain threshold, which meets the termination condition, and then going to step 3);

3) Saving the pruned network: removing the channel selection layer and copying the weight data to a new network, the new network being the pruned convolutional neural network.

Further in step 1), the channel selection layer is constructed as follows: supposing the feature map after a certain layer has C channels, defining the C non-learnable parameters of the channel selection layer as $\text{mask}=[m_1, m_2, m_3 \ldots, m_C]$, wherein m1, m2, m3, . . . mC are the coefficients corresponding to the C channels in the feature map, and their values are 0 or 1. 0 means that the channel cannot transfer to the later calculation, and 1 means that the channel can transfer to the later calculation.

Further, in step 1), the calculation of the average value of the feature map channels is specifically as follows:

At the beginning of each training epoch, define the corresponding mean variable ch_avg for each channel of the feature map after each activation layer, with the initial value being 0. When the first batch of the training epoch is calculated, obtain ch_avg:

$$ch\_avg = \frac{1}{batch\_size} \sum_{i=0}^{i=batch\_size} \sum_{j=1}^{H} \sum_{k=1}^{W} |m_{i,j,k}|$$

wherein, batch_size is the batch size, H and W are the height and width of the feature map, respectively, and $m_{i,j,k}$ is the No. (j,k) numerical value of the corresponding channel of the i th sample.

For batches starting from the second, calculating the mean value of the channel according to the above formula and recording it as new_ch_avg. At the same time, update ch_avg as follows:

ch_avg ← (momentum × ch_avg + (1 − momentum) × new_ch_avg)

wherein, momentum is a momentum parameter with a value between 0.9 and 0.99; the meaning of "←" is to assign the right value of "←" to the left.

Further, in step 2.3), the termination conditions are defined as follows:

The ratio of the number of pruned channels to the total number of network channels is defined as pruned ratio, which is expressed as pruned_ratio. The upper limit of pruned ratio is expressed as upper_ratio and the lower limit of pruned ratio is expressed as lower_ratio. The termination condition is set to upper_ratio−lower_ratio<η, the value of η involves the number of iterations to find the near-optimal pruned ratio, which is generally 0.005-0.2.

Further, in step 2.3), the way to increase or decrease the pruned ratio is as follows:

pruned_ratio is the pruned ratio of this iteration.

Increase the pruned ratio as follows:

lower_ratio ← pruned_ratio $$pruned\_ratio \leftarrow \frac{pruned\_ratio + upper\_ratio}{2}$$

Decrease the pruned ratio as follows:

upper_ratio ← pruned_ratio $$pruned\_ratio \leftarrow \frac{pruned\_ratio + lower\_ratio}{2}$$

The meaning of "←" is to assign the right value of "←" to the left.

Further, the method is applied to crop disease classification, i.e. collecting crop leaves pictures as a dataset, performing sparsification training and network pruning on the feature maps in the convolutional neural network to obtain the pruned convolutional neural network, and inputting the field collected crop leaves pictures into the pruned network, and the output is the category of crop diseases.

The beneficial effect of the present invention is to provide a convolutional neural network pruning method based on feature map sparsification. By adding regularization to the feature map L1 or L2 after the activation layer in the loss function, the corresponding feature map channels have different sparsity. After that, the convolution kernels corresponding to the channels are pruned according to the sparsity of the feature map channels. After multiple iterations, the near-optimal pruned ratio is found, and pruning is realized to the maximum extent under the condition that the accuracy does not decrease. Convolutional neural network compressed by this pruning method is hardware-friendly and can be deployed on various hardware platforms.

DESCRIPTION OF THE EMBODIMENTS

Hereinafter, the specific embodiments of the present invention will be described in further detail with reference to the drawings.

The classification of crop (tomato) diseases is selected as the task, the diseases include tomato powdery mildew, early blight, spot disease and so on, and the dataset is the picture set of crop (tomato) leaves. The convolutional neural network adopts the structure of feature extraction unit superposition composed of convolution layer, batch normalization layer and ReLu activation layer, with a final linear layer outputting the category. The feature extraction unit is denoted as C, the pool layer is denoted as M, the linear layer is denoted as L, and the 16-layer network structure is denoted as [C(64),C(64),M,C(128),C(128),C(128),M,C(256),C(256),C(256),M,C(512),C(512),C(512),M,L], where the number in parentheses indicates the number of channels.

Figure 1:
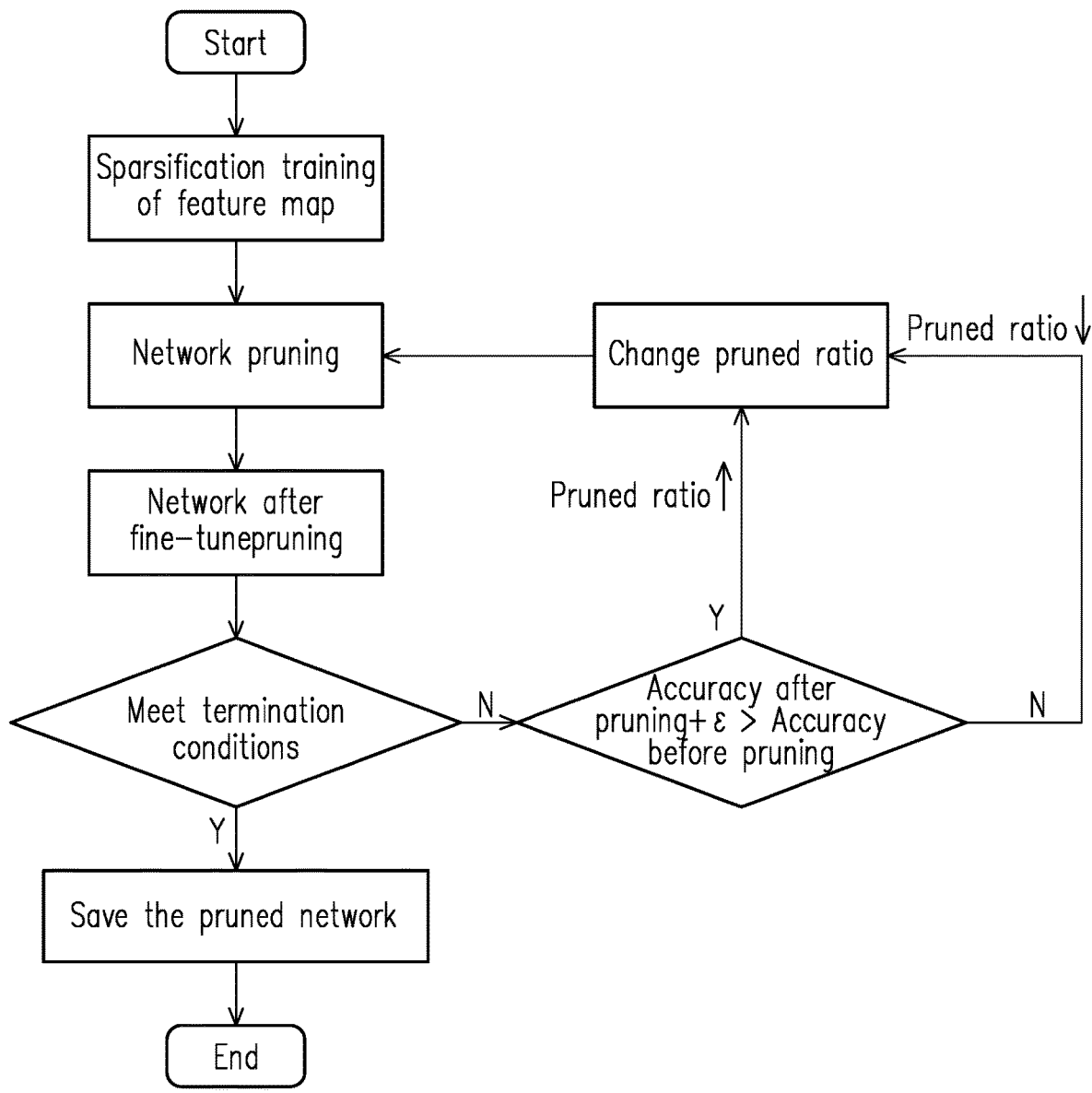
FIG. 1 is a flow chart of the method of the present invention.

As shown in FIG. 1, which is the flow chart of the method of the present invention, the specific implementation steps of the invention are as follows: performing sparsification training on the feature maps output by each feature extraction unit in the above-mentioned convolutional neural network;

1.1) Adding a sparsification term of feature maps behind all activation layers to the loss function of the convolutional neural network:

$$L = \sum_{(x,y)} l(f(x, W), y) + \lambda \times \sum_{l=1}^{l=L} \sum_{c=1}^{c=C_l} \left( \frac{1}{H_{l,c} W_{l,c}} \sum_{i=1}^{i=H_{l,c}} \sum_{j=1}^{j=W_{l,c}} g(m_{i,j}) \right)$$

where the first item is the loss caused by the model prediction, x is the input of the network, i.e. the tomato leaf picture data, W is the weight of the network, f(x, W) is the output of the network, and y is the sample label. In this example, the sample label is an integer between 0 and 16.

The second item is the sparsification item of the feature map after all activation layers, λ is the sparsification factor controlling the proportional relationship between the two items, its value is preferably 0.0001-0.0005. l is the activation layer index, with a value range of 1-10. L is the number of the activation layer, which is 10. c is the channel index of the feature map after the lth activation layer, $C_l$ is the channel number of the feature map after the lth activation layer, $H_{l,c}$ and $W_{l,c}$ are the height and width of the cth channel of the feature map after the lth activation layer, respectively, $m_{i,j}$ is the No. (i,j) numerical value of the corresponding feature map, and g( ) is L1 or L2 regularization.

L1 regularization formula is:

$g(m_{i,j}) = \|m_{i,j}\|_1$

Figure 2:
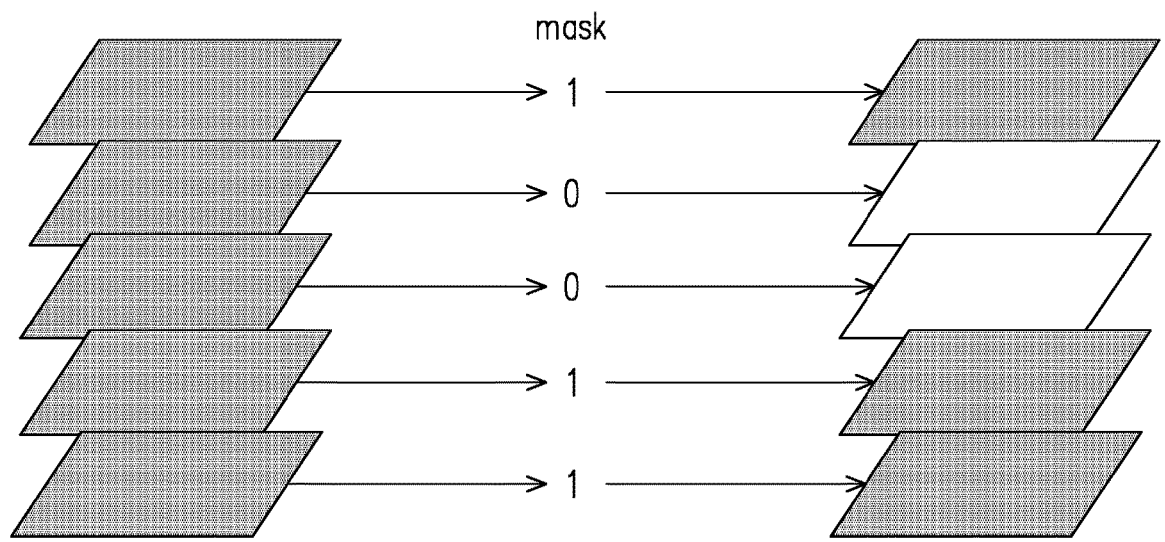
FIG. 2 is a schematic diagram of a channel selection layer of the present invention.

L2 regularization formula is:

$g(m_{i,j}) = \|m_{i,j}\|_2$ 1.2) Adding a channel selection layer after the activation layer. Supposing the feature map after a certain layer has C channels, defining the C non-learnable parameters of the channel selection layer as mask=[$m_1$, $m_2$, $m_3$, . . . , $m_C$], wherein m1, m2, m3, . . . mC are the coefficients corresponding to the C channels in the feature map, and their values are 0 or 1. 0 means that the channel cannot transfer to the later calculation, and 1 means that the channel can transfer to the later calculation. As shown in FIG. 2, in the case of C=5, mask=[1, 0, 0, 1, 1], the channel corresponding to value of 1 can transfer through the channel selection layer. In the initial state, values of all the C non-learnable parameters are 1.

1.3) In the training process, calculating the mean value for each channel of the feature map after the activation layer, as the evidence of the importance of the channel. Different input samples have different calculated feature maps. The mean value of the feature map channel is obtained by traversing the entire training dataset.

At the beginning of each training epoch, defining the corresponding mean variable ch_avg for each channel of the feature map after each activation layer, with the initial value being 0; When the first batch of the training epoch is calculated, obtain ch_avg:

$$\text{ch\_avg} = \frac{1}{\text{batch\_size}} \sum_{i=0}^{i=\text{batch\_size}} \sum_{j=1}^{H} \sum_{k=1}^{W} |m_{i,j,k}|$$

wherein, batch_size is the batch size, H and W are the height and width of the feature map, respectively, and $m_{i,j,k}$ is the No. (j, k) numerical value of the corresponding channel of the ith sample; for batches starting from the second, calculating the mean value of the channel according to the above formula and recording it as new_ch_avg; At the same time, update ch_avg as follows:

ch_avg←(momentum×ch_avg+(1−momentum)×new_ch_avg)

wherein, momentum is a momentum parameter with a value between 0.9 and 0.99; the meaning of "←" is to assign the right value of "←" to the left.

1.4) After the feature map is subject to sparsification training for several epochs, the network converges, and the highest accuracy initial_acc of the verification set is recorded. In this example, after training for 160 epochs, the network can converge, and the highest accuracy of the verification set is 88.03%.

2) network pruning:

2.1) The convolutional neural network loads the network weight with the highest accuracy in the verification set during training. Sorting ch_avg of the channels of the feature map from small to large.

The ratio of the number of pruned channels to the total number of network channels is defined as pruned ratio, which is expressed as pruned_ratio. The number of pruned channels is pruned_channels=pruned_ratio×the total number of channels in the network. Setting an upper limit upper_ratio of the pruned ratio as 1 and a lower limit lower_ratio of the pruned ratio as 0; the initial pruned ratio is 0.5. The mean value of the feature map of each channel that has been sorted, that is $\text{sort}_{min \rightarrow max}\{\text{ch\_avg}\}$, the mask value of the channel selection layer corresponding to the first pruned_channels number of channels is set to 0, and the mask value of the channel selection layer corresponding to the remaining channels is set to 1.

2.2) After changing the mask value of the channel selection layer, fine-tune the network, that is, continue to train a certain number of epoch, with a value of 60. After the network converges, record the highest accuracy pruned_acc of the pruned network on the verification set.

2.3) Determine whether the termination condition is met, and the value of the termination condition is set to upper_ratio−lower_ratio<η, the value of η involves the number of iterations to find the near-optimal pruned ratio, and the general value is 0.005-0.02. If the termination condition is met, determine whether pruned_acc+ε is greater than initial_acc, if so, let $\text{lower}_{ratio}$=pruned_ratio, and save the network weight at this time; if not, do not deal with it. Then proceed to step 3). If the termination condition is not met, proceed to step 2.4).

2.4) Compare the highest accuracy pruned_acc after pruning with the highest accuracy initial_acc before pruning, and set the maximum allowable accuracy loss after pruning as ε. If pruned_acc+ε>initial_acc, it means that under this pruned ratio, the accuracy of the network can be maintained, the pruned ratio can be increased, and the network weight at this time can be saved; If pruned_acc+ε<initial_acc, it means that the accuracy decreases under this pruned ratio, and it is necessary to reduce the pruning degree.

Increase the pruned ratio as follows:

lower_ratio ← pruned_ratio pruned_ratio ← $\frac{\text{pruned\_ratio} + \text{upper\_ratio}}{2}$ Decrease the pruned ratio as follows:

upper_ratio ← pruned_ratio pruned_ratio ← $\frac{\text{pruned\_ratio} + \text{lower\_ratio}}{2}$ Repeat steps 2.1) to 2.4) according to the new lower_ratio, pruned_ratio and upper_ratio until the termination condition of step 2.3) is met. The meaning of "←" is to assign the right value of "←" to the left.

3) Save the pruned network

Remove the channel selection layer as follows, and copy the weight data to the new network.

3.1) Sum each channel selection layer to obtain an array cfg=[$c_1, c_2, c_3 \ldots c_{n-1}, c_n$]. On the basis of keeping the network structure unchanged, redefine the number of channels in each layer of the network according to cfg.

3.2) Copy the weights of convolution layer, batch normalization layer and linear layer to the new network.

Figure 3:
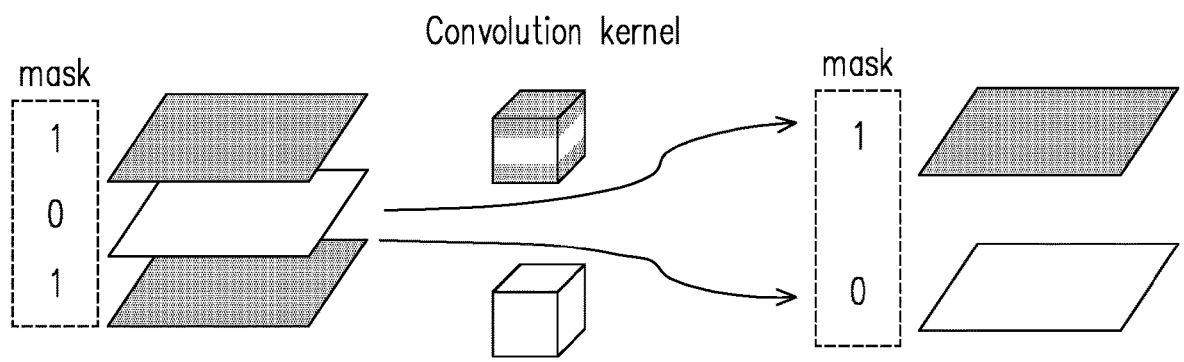
FIG. 3 is a diagram showing copying of convolution layer weight according to the present invention.

For the weight of the convolution layer, as shown in FIG. 3, the mask value of the channel selection layer after the previous feature extraction unit is [1,0,1], and the mask value of channel selection layer after the next feature extraction unit is [1,0]. The number of input channels and output channels of the convolution layer corresponding to the new network is 2 and 1, respectively, and the weight to be copied corresponds to the gray part of the convolution kernel in FIG. 3.

For the batch normalization layer, copy the channel weight data with the mask value of 1 in the channel selection layer to the new network, which is the pruned convolutional neural network;

Input the collected pictures of crop (tomato) leaves into the pruned convolutional neural network, and outputting as a category of crop (tomato) diseases.

In this embodiment, the number of parameters of the network before pruning is 20.04 M, and the amount of computation is 12.59 GFlops. The optimal pruned ratio obtained by this method is 56.25%, the number of parameters of the network after pruning is 4.54 M, and the amount of computation is 3.02 GFlops. The number of parameters is reduced by 77.35%, and the forward calculation speed is increased by more than 4 times.

The above embodiments are used to explain the present invention, but not to limit it. Any modifications and changes made to the present invention within the spirit of the present invention and the protection scope of the claims shall fall into the protection scope of the present invention.

What is claimed is:

1. A convolution neural network pruning method based on feature map sparsification, wherein the method being applied to crop disease classification and specifically comprising the following steps:

1) collecting pictures of crop leaves as a training data set;

2) performing sparsification training on a feature map in the convolutional neural network through the training data set of step 1);

in the training process, adding a sparsification item of the feature map to a loss function of the convolutional neural network;

$$loss_f = \sum_{(x,y)} l(f(x, W), y) + \lambda \times \sum_{l=1}^{l=L} \sum_{c=1}^{c=C_l} \left( \frac{1}{H_{l,c} W_{l,c}} \sum_{i=1}^{i=H_{l,c}} \sum_{j=1}^{j=W_{l,c}} g(m_{i,j}) \right)$$

wherein, the first item is the loss resulted from the model prediction, x is the input of network, i.e. the picture data of crop leaves, W is the weight of network, f(x, W) is the output of network and y is the sample label; the second item is a loss item of a feature map after all activation layers, λ is a sparsification factor controlling the proportional relationship between the loss resulted from the convolution neural network prediction and the sparsification item loss, l is the activation layer index, L is the number of the activation layer, c is the channel index of the feature map after the lth activation layer, $C_l$ is the channel number of the feature map after the lth activation layer, $H_{l,c}$ and $W_{l,c}$ are the height and width of the cth channel after the lth activation layer, respectively, and $m_{i,j}$ is No. (i,j) numerical value of corresponding feature map; and g( ) is L1, L2 regularization or other regular items;

L1 regularization formula is:

$g(m_{i,j})=\|m_{i,j}\|_1$

L2 regularization formula is:

$g(m_{i,j})=\|m_{i,j}\|_2$ calculating a mean value of the feature map channel by traversing the entire training data set using the mean value as sparsity of the feature map, the sparsity being different due to different input samples, at the same time, saving the sparsity of the feature map, adding a feature map channel selection layer, and after training the convolutional neural network and making it convergent, saving the highest accuracy of the verification set and the corresponding network weight;

3) network pruning:

3.1) setting an initial pruned ratio, and setting an upper limit of the pruned ratio as 1 and a lower limit of the pruned ratio as 0;

3.2) taking a weight of the network with the highest accuracy of the verification set as the weight of the convolutional neural network, and pruning according to the following rules:

sorting the sparsity of each channel of the feature map from small to large, i.e. the sort$_{min \to max}$ {feature map sparsity}, and then setting a value of non-learnable parameter mask of the channel selection layer corresponding to the first n channels as 0 and a value of non-learnable parameter mask of the channel selection layers corresponding to the remaining channels as 1 according to the pruned ratio for the sparsity of the feature map of each channel;

retraining the pruned network until convergence of the network, and obtaining the highest accuracy of the pruned verification set;

3.3) comparing the highest accuracy of verification sets before and after pruning, if the highest accuracy of verification set after pruning is greater than or equal to the highest accuracy of verification set before pruning, taking the current pruned ratio as a new lower limit of the pruned ratio, and increasing the pruned ratio; otherwise, taking the current pruned ratio as a new upper limit of the pruned ratio, and reducing the pruned ratio, repeating steps 3.2) and 3.3) until the difference between the upper and lower limits of the pruned ratio is less than a certain threshold, which meets the termination condition, and then going to step 4);

4) saving the pruned network: removing the channel selection layer and copying the weight data to new network, the new network being the pruned convolutional neural network;

5) inputting the pictures of crop leaves collected on site into the pruned network and outputting them as a crop disease category.

2. The convolutional neural network pruning method based on feature map sparsification according to claim 1, wherein in step 2), the channel selection layer is constructed as follows: supposing the feature map after a certain layer has C channels, defining the C non-learnable parameters of the channel selection layer as mask=$[m_1, m_2, m_3 \ldots, m_C]$, wherein $m_1, m_2, m_3, \ldots m_C$ are the coefficients corresponding to the C channels in the feature map, and their values are 0 or 1, 0 meaning that the channel cannot be transferred to the later calculation, and 1 meaning that the channel can be transferred to the later calculation.

3. The convolutional neural network pruning method based on feature map sparsification according to claim 1, wherein step 2), the mean value of feature map channels is calculated as follows:

at the beginning of each training epoch, defining the corresponding mean variable ch_avg for each channel of the feature map after each activation layer, with the initial value being 0; when calculating the first batch of the training epoch, getting ch_avg;

$$\text{ch\_avg} = \frac{1}{\text{batch\_size}} \sum_{i=0}^{i=batch\_size} \sum_{j=1}^{H} \sum_{k=1}^{W} |m_{i,j,k}|$$

wherein, batch_size is the batch size, H and W are the height and width of the feature map, respectively, and $m_{i,j,k}$ is the No. (j,k) numerical value of the corresponding channel of the ith sample;

for batches staring from the second, calculating the mean value of the channel according to the above formula and recording it as new_ch_avg; at the same time, updating ch_avg as follows:

ch_avg ← (momentum×ch_avg+(1−momentum)× new_ch_avg)

wherein, momentum is a momentum parameter with a value queen 0.9 and 0.99; the meaning of "←" to assign the right value of "←" to the left.

4. The convolutional neural network pruning method based on feature map sparsification according to claim 1, wherein in step 3.3), the termination condition is defined as follows:

defining the ratio of the number of pruned channels to the total number of network channels as the pruned ratio, expressed as pruned_ratio; the upper limit of the pruned ratio is expressed as upper_ratio, and the lower limit of pruned ratio is expressed as lower_ratio; setting the termination condition as upper_ratio−lower_ratio<$\eta$, and the value of $\eta$ is between 0.005 and 0.2 as the value involves the number of iterations to find the near optimal pruned ratio.

5. The convolutional neural network pruning method based on feature map sparsification according to claim 4, wherein in step 3.3), the way to increase or decrease the pruned ratio is as follows:

pruned_ratio is the pruned ratio of this iteration;
increasing the pruned ratio as follows:

lower_ratio ← pruned_ratio $$\text{pruned\_ratio} \leftarrow \frac{\text{pruned\_ratio} + \text{upper\_ratio}}{2}$$

decreasing the pruned ratio as follows:

upper_ratio ← pruned_ratio $$\text{pruned}_{ratio} \leftarrow \frac{\text{pruned}_{ratio} + \text{lower}_{ratio}}{2}$$

the meaning of "←" is to assign the right value of "←" to the left.

* * * * *